US007828331B2

(12) United States Patent
Jessup et al.

(10) Patent No.: US 7,828,331 B2
(45) Date of Patent: Nov. 9, 2010

(54) VARIABLE LOAD LIMITING DEVICE FOR SEATBELT RETRACTOR TO REDUCE OCCUPANT INJURY

(75) Inventors: Andrew D. Jessup, Dublin, OH (US); Chuck Thomas, Worthington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 139 days.

(21) Appl. No.: 12/169,987

(22) Filed: Jul. 9, 2008

(65) Prior Publication Data
US 2010/0007125 A1    Jan. 14, 2010

(51) Int. Cl.
*B60R 22/28*    (2006.01)
(52) U.S. Cl. .................................... 280/805; 242/379.1
(58) Field of Classification Search .............. 280/805, 280/806; 297/470, 471; 188/290, 293, 294, 188/296
See application file for complete search history.

(56) References Cited

U.S. PATENT DOCUMENTS

| 3,484,134 | A | 12/1969 | Townsend |
| 4,207,563 | A | 6/1980 | Soupal |
| 6,102,439 | A * | 8/2000 | Smithson et al. ............ 280/805 |
| 6,129,385 | A | 10/2000 | Blackadder |
| 6,168,205 | B1 * | 1/2001 | Smithson et al. ............ 280/805 |
| 6,183,015 | B1 * | 2/2001 | Smithson et al. ............ 280/805 |
| 6,196,589 | B1 * | 3/2001 | Smithson et al. ............ 280/805 |
| 6,209,916 | B1 | 4/2001 | Smithson et al. |
| 6,290,159 | B1 | 9/2001 | Specht et al. |
| 6,419,272 | B1 | 7/2002 | Yamaguchi et al. |
| 6,659,505 | B1 * | 12/2003 | Knox ......................... 280/806 |
| 6,695,243 | B2 | 2/2004 | Specht |
| 6,719,233 | B2 | 4/2004 | Specht et al. |
| 6,786,511 | B2 | 9/2004 | Heckmayr |
| 6,789,761 | B2 | 9/2004 | Glinka |
| 6,843,504 | B2 | 1/2005 | Motozawa |
| 6,877,776 | B2 | 4/2005 | Ukita et al. |

OTHER PUBLICATIONS

International Search Report of PCT/US2009/048892 dated Aug. 31, 2009.
Written Opinion of PCT/US2009/048892 dated Aug. 31, 2009.

* cited by examiner

*Primary Examiner*—Paul N Dickson
*Assistant Examiner*—Joseph Rocca
(74) *Attorney, Agent, or Firm*—Mark E. Duell; Rankin Hill & Clark LLP

(57) ABSTRACT

A variable load limiting device for a vehicle safety belt assembly is provided for controllably restraining a vehicle occupant by the vehicle safety belt assembly during deceleration of a vehicle. The device includes a body including a fluid chamber for containing a free-flowing fluid therein. A wiper assembly is operably disposed in the fluid chamber and selectively coupled to the vehicle safety belt assembly. The wiper assembly creates a pressure differential within the fluid chamber when a force in excess of a predetermined value is applied to the vehicle safety belt assembly. A throttle valve is operably connected to the body for controlling fluid pressure in the fluid chamber.

17 Claims, 2 Drawing Sheets

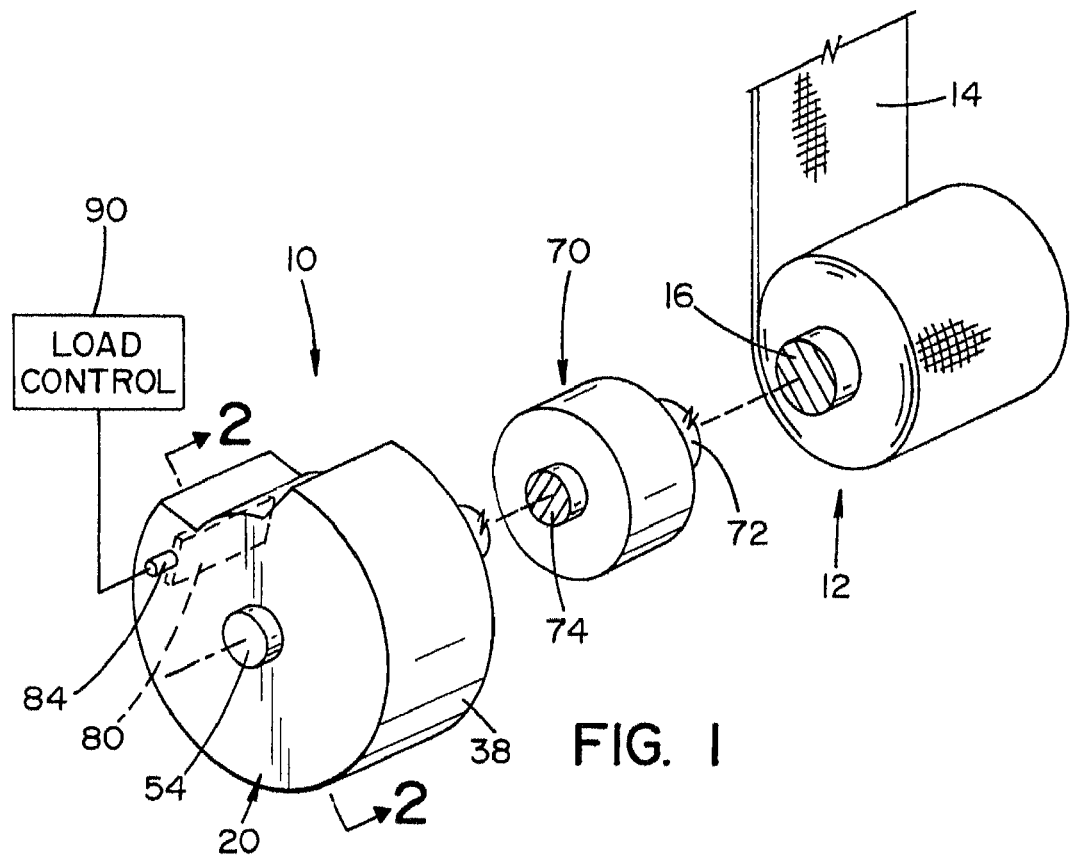
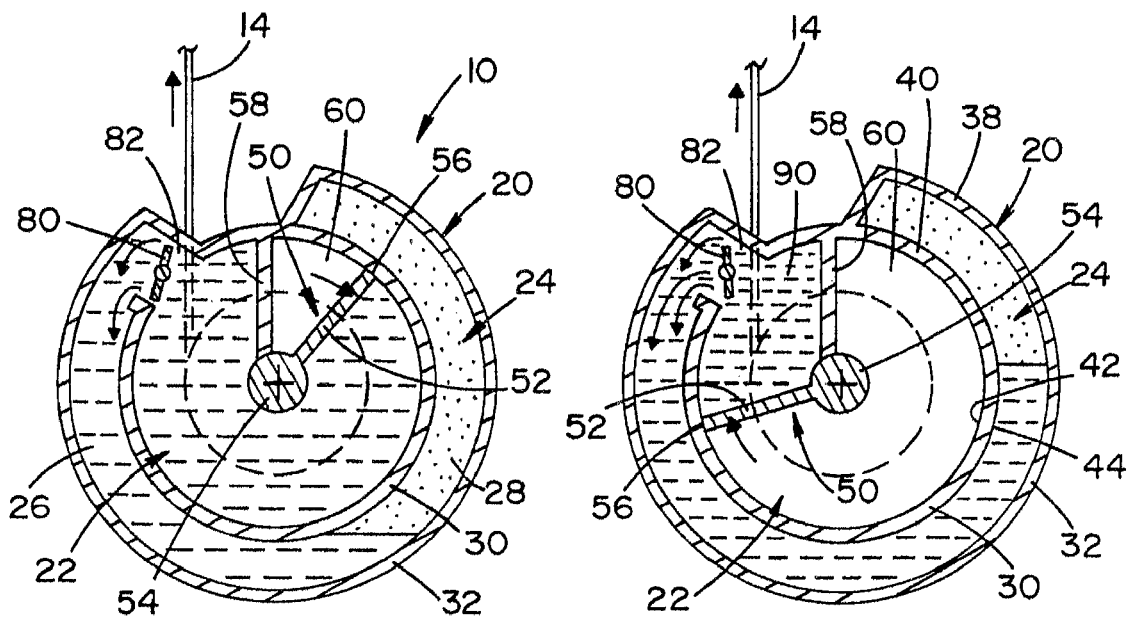

US 7,828,331 B2

VARIABLE LOAD LIMITING DEVICE FOR SEATBELT RETRACTOR TO REDUCE OCCUPANT INJURY

BACKGROUND

The present disclosure generally relates to a load limiting device for a vehicle safety restraint belt. More particularly, the present disclosure relates to a variable load limiting device for a seatbelt retractor.

Conventionally, a vehicle safety restraint comprises seat belt webbing which passes around the torso and around the lap of a vehicle occupant to secure the occupant in a vehicle seat. One end of the seat belt webbing is attached to a releasable buckle and the other end is wound onto a rotatable spool of a retractor. The retractor allows a vehicle occupant to move, provided the movement is relatively gentle. However, in a crash when the occupant is subject to a sudden deceleration, the retractor locks to prevent any further payout and to securely restrain the occupant.

In high velocity crashes, the force exerted by the seat belt webbing on the vehicle occupant is extremely high and can itself cause injury. Load limiting devices are generally provided to controllably absorb and dissipate some of this force felt by the occupant. The load limiting devices can be introduced into any part of the webbing force path. For example, a load limiter may be incorporated into the buckle mounting, or into the retractor itself, such as in the winding of the spool.

The load limiting device can have one or more components which become mechanically deformed when a pre-determined force is exceeded. Torsion bars are, for example, used as such deformable components and are arranged to twist in the direction of the belt winding out due to a rotational movement of the retractor.

A problem with the known systems which rely on bending torsion bars is that the force absorbed is the same at low speeds, with small, light occupants, as at high speeds with large occupants. This constant force means that the large occupant, or the high speed crash, causes more payout of seat belt webbing than for low speeds, and in worst case situations the forward movement of the occupant, despite the belt restraint, can be so excessive as to result in an impact with an interior part of the vehicle thereby causing injury.

Hydraulic systems have been used in which a feedback loop is provided so that a higher force can be absorbed with a higher speed of movement. In these arrangements, the absorbed force rises exponentially with the speed of movement of the occupant. However, this rapidly increasing force absorption can be too severe and at very high speeds the force felt by the occupant is likely to be excessive.

BRIEF DESCRIPTION

In accordance with one aspect, a variable load limiting device for a vehicle safety belt assembly controllably restrains a vehicle occupant by the vehicle safety belt assembly during deceleration of a vehicle. The device includes a body including a fluid chamber for containing a free-flowing fluid therein. A wiper assembly is operably disposed in the fluid chamber and selectively coupled to the vehicle safety belt assembly. The wiper assembly creates a pressure differential within the fluid chamber when a force in excess of a predetermined value is applied to the vehicle safety belt assembly. A throttle valve is operably connected to the body for controlling fluid pressure in the fluid chamber.

In accordance with another aspect, a vehicle safety belt assembly for controllably restraining a vehicle occupant during deceleration of a vehicle is provided. The vehicle safety belt assembly comprises a retractor for winding up a safety belt and a variable load limiting device. The device includes a body including at least one fluid chamber containing hydraulic fluid and a wiper assembly connected to the body. The wiper assembly includes a wiper rotatably disposed in the at least one chamber. A throttle valve is connected to the body for controlling fluid pressure in the at least one fluid chamber. When a force applied to the retractor exceeds a predetermined value, the retractor engages the wiper assembly. The wiper rotates in the at least one fluid chamber creating a volume of high pressure within the at least one fluid chamber which resists and absorbs a portion of the applied force.

In accordance with yet another aspect, a variable load limiting device for a vehicle safety belt assembly controllably restrains a vehicle occupant by the vehicle safety belt assembly during deceleration of a vehicle. The device includes a body including a first fluid chamber and a separate second fluid chamber. A wiper assembly is operably disposed in the first chamber and selectively coupled to the vehicle safety belt assembly. The wiper assembly includes a wiper for creating a pressure differential within the first chamber when a force in excess of a predetermined value is applied to the vehicle safety belt assembly. A throttle valve is operably disposed in a fluid passage defined by the body. The fluid passage fluidly connects the first and second fluid chambers. The throttle valve controls fluid pressure in the first chamber by selectively allowing fluid flow between the first chamber and second chamber.

BRIEF DESCRIPTION OF THE DRAWINGS

FIG. 1 is an exploded schematic view of a variable load limiting device operably connected to a vehicle safety belt assembly.

FIG. 2 is a cross-sectional view of the variable load limiting device of FIG. 1 taken generally along line 2-2 of FIG. 1 in a first position.

FIG. 3 is a cross-sectional view of the variable load limiting device of FIG. 1 taken generally along line 2-2 of FIG. 1 in a second position.

DETAILED DESCRIPTION

Figure 4:
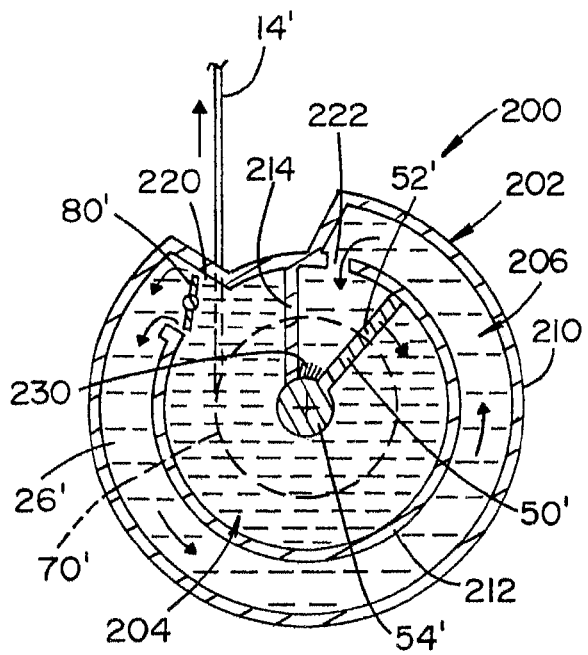
FIG. 4 is a cross-sectional view of an alternate variable load limiting device in a first position.

It should, of course, be understood that the description and drawings herein are merely illustrative and that various modifications and changes can be made in the structures disclosed without departing from the present disclosure. It will also be appreciated that the various identified components of the load limiting device disclosed herein are merely terms of art that may vary from one manufacturer to another and should not be deemed to limit the present disclosure. All references to direction and position, unless otherwise indicated, refer to the orientation of the load limiting device illustrated in the drawings and should not be construed as limiting the claims appended hereto.

Referring now to the drawings, wherein like numerals refer to like parts throughout the several views, FIGS. 1-3 illustrate a variable load limiting device 10 according to one aspect of the present disclosure. The variable load limiting device is used in combination with a vehicle safety belt assembly 12 for controllably restraining a vehicle seat-belted occupant by the vehicle safety belt assembly during deceleration of a vehicle. The vehicle safety belt assembly generally includes a seat belt or webbing 14 for restraining the vehicle occupant to a seat (not shown), which is mounted on a floor panel and forms an integral part of a vehicle body. One end of the seat belt is wound on a spindle or retractor 16. The other end of the seat belt is fixedly attached to a fixed part of the vehicle body. The retractor is typically incorporated with an emergency locking arrangement for preventing the seat belt 14 from being paid out from the retractor under a prescribed high acceleration condition as well known in the art.

The variable load limiting device 10 comprises a body 20 having at least one fluid chamber for containing a free-flowing fluid therein. More particularly, the body includes a first fluid chamber 22 in selective fluid communication with a second fluid chamber 24. Each fluid chamber contains at least one free-flowing fluid therein to form a sealed body. In this embodiment, the at least one free-flowing fluid is a combination of a hydraulic fluid 26 and an inert gas 28, the hydraulic fluid being contained in both fluid chambers while the inert gas is contained in a portion of the second fluid chamber. An inert gas is used because oxygen and oil can form an explosive mixture when combined under high pressure.

As shown in FIGS. 2 and 3, the body 20 includes a first housing 30 which at least partially defines the first fluid chamber 22 and a second housing 32 which at least partially defines the second fluid chamber 24. The first and second housings have respective first and second longitudinal axes, which in the illustrated embodiment, are generally coincident. Although, it should be appreciated that the longitudinal axes can be offset from each other. In the depicted embodiment, the second housing 32 at least partially surrounds the first housing 32 to form a compact device. To this extent, the body 20 includes an outer wall 38 and an inner wall 40. An inner surface 42 of the inner wall at least partially defines the first fluid chamber 22. An outer surface 44 of the inner wall and the outer wall 38 at least partially define the second fluid chamber 24. However, it should be appreciated that the first housing 30 can be separate and spaced from the second housing 32 in alternate constructions.

A wiper assembly 50 is operably disposed in the first fluid chamber 22 and is selectively coupled to the vehicle safety belt assembly 12. The wiper assembly creates a pressure differential within at least one of the first and second fluid chambers when a force in excess of a predetermined value is applied to the vehicle safety belt assembly. The wiper assembly 50 includes a wiper 52 moveably located in the first fluid chamber 22 via a shaft 54. The wiper extends outwardly from the shaft and can be integrally formed with the shaft; although, this is not required. An end 56 of the wiper sealing engages the inner surface 42 of the wall 40. Opposed sides (not shown) of the wiper sealing engage the body 20. As will be discussed in greater detail below, the wiper assembly 50 and a radial wall 58 extending inwardly from the body 20 into the first fluid chamber 22 together define a first fluid chamber low pressure zone 60. As shown in FIGS. 2 and 3, preferably, no hydraulic fluid 26 is contained in the low pressure zone.

The variable load limiting device 10 further comprises a clutch 70. As shown in FIG. 1, an input 72 of the clutch is operably connected to the retractor 16 of the vehicle safety belt assembly 12 and an output 74 of the clutch is operably connected to the wiper assembly 50. In this embodiment, the clutch 70 is a centrifugal clutch; although, this is not required. As is well known, a centrifugal clutch is a clutch that works off of rotational motion (i.e. centrifugal force) rather than lateral motion. In a crash when the occupant is subject to a sudden deceleration, the rpm (revolutions per minute) or rotational speed of the retractor 16 increases which, in turn, activates the clutch 70. The clutch engages the wiper assembly 50 causing the wiper 52 to rotate within the first fluid chamber 22. This rotation decreases the rpm of the retractor which, in turn, disengages the clutch and the variable load limiting device 10 from the retractor.

A throttle valve 80 is operably connected to the body 20 between the fluid chambers for controlling fluid pressure in the first fluid chamber 22 and the second fluid chamber 24 by selectively allowing fluid flow between the first fluid chamber and the second fluid chamber. As shown in FIGS. 2 and 3, the throttle valve is located in a fluid passage 82 defined by the body 20, the fluid passage fluidly connecting the first and second fluid chambers. The throttle valve has a conformation corresponding to the cross-sectional shape of the passage 82 and can be pivotally mounted to the body via pivot pins 84 which are sealingly received in corresponding openings (not shown) located on the body 20. Although, alternative manners for mounting the throttle valve are also contemplated. A control unit or load control 90 is operably connected to the throttle valve 80. The load control adjusts the throttle valve as a function of vehicle crash-related data. More particularly, the load control can include sensors, such as occupant and crash sensors, which provide occupant and crash-related signals to the variable load limiting device 10 when a crash meeting a prescribed condition is detected. In response to a crash detecting signal, the throttle valve can be opened to bleed fluid from the first fluid chamber 22 to the second fluid chamber 24 as the wiper assembly 50 rotates via the clutch 70.

In operation, during a high velocity crash, when the force exerted by the seat belt 14 on the vehicle occupant is extremely high and can itself cause injury, the variable load limiting device 10 controllably absorbs and dissipates some of this force felt by the occupant. More particularly, as the seat-belted occupant is displaced forward, the rapid payout of the seat belt 14 from the retractor 16 causes the retractor to quickly rotate. This rotary motion is transmitted to the input 72 of the centrifugal clutch 70. As the rpm of the input 72 exceed a predetermined rpm, the output 74 of the centrifugal clutch begins to rotate. This rotary motion is translated to the wiper assembly 50.

As the wiper 52 begins to rotate within the first fluid chamber 22, the hydraulic fluid 26 is moved towards the throttle valve 80. This rotation forms a high pressure zone 90 in the first fluid chamber and increases the volume of the low pressure zone 60. This high pressure zone, in turn, controls the payout of the seat belt 14 by decreasing the rpm of the retractor 16. As a result, the restraint of the seat belt on the vehicle occupant increases which corresponds to the deceleration of the vehicle occupant at a very early phase of a crash.

As is well known, hydraulic fluid is non-compressible. Thus, as the wiper assembly 50 moves, the hydraulic fluid 26 is displaced by the wiper 52 and the throttle valve 80 is opened to controllably allow the fluid to flow into the second fluid chamber 24. As indicated previously, in response to a crash-related data from the load control 90, the displacement of the throttle valve 80 can be varied to bleed the fluid 26 from the first fluid chamber 22 to the second fluid chamber 24 as the wiper assembly rotates. For example, depending on the severity of a crash, a small, light vehicle occupant may require a smaller high pressure zone 90 than a larger vehicle occupant. In that instance, the throttle valve can increase the fluid flow between the first and second fluid chambers.

As shown in FIG. 2, the second fluid chamber contains both hydraulic fluid 26 and inert gas 28. An elastic diaphragm (not shown) can be implemented to separate the hydraulic fluid from the inert gas. As shown in FIG. 3, as fluid 26 is bled into the second fluid chamber 24 from the first fluid chamber 22 via the throttle valve 80, the fluid compresses the inert gas, thus storing hydraulic energy. The second fluid chamber acts as an energy storage device, a pressure storage reservoir in which the non-compressible hydraulic fluid 26 is held under pressure by the wiper assembly 50. As the volume of the compressed gas changes, the pressure of the gas and the pressure on the fluid changes inversely. A drop in the fluid pressure of the first fluid chamber 22, caused by the disengagement of the clutch 70 with the wiper assembly, forces the hydraulic fluid 26 that was bled into the second fluid chamber 24 back into the first fluid chamber. The low pressure zone 60 also acts as a vacuum which draws the wiper assembly back to its original position. Thus, the pressure differential in the fluid chambers created by activation of the wiper assembly 50 returns the load limiting device 10 to a state which is substantially similar to a state prior to activation of the load limiting device whereby the load limiting device may be activated a plurality of times.

Figure 5:
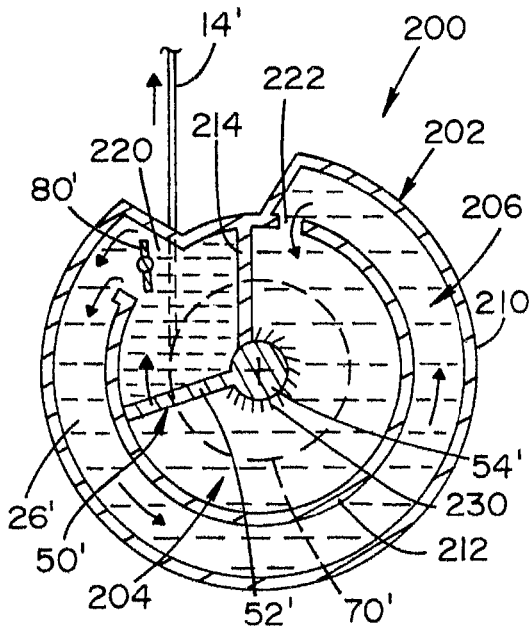
FIG. 5 is a cross-sectional view of the variable load limiting device of FIG. 4 in a second position.

Similar to the aforementioned embodiment, a second embodiment of a variable load limiting device is shown in FIGS. 4 and 5. Since most of the structure and function is similar, reference numerals with a single primed suffix (') refer to like components (e.g., throttle valve 80 is referred to by reference numeral 80'), and new numerals identify new components in the additional embodiment.

With reference to FIGS. 4 and 5, a variable load limiting device 200 for the vehicle safety belt assembly (FIG. 1) includes a body 202 defining a first fluid chamber 204 and a separate second fluid chamber 206. Each fluid chamber contains at least one free-flowing fluid therein to form a sealed body. In this embodiment, the at least one free-flowing fluid is a hydraulic fluid 26'. The body 202 includes an outer wall 210 and an inner wall 212 and a radial wall 214. The inner wall and radial wall together at least partially define the first fluid chamber 204. The outer wall and inner wall together at least partially define the second fluid chamber 206.

A wiper assembly 50' is operably connected to the body. The wiper assembly includes a wiper 52' rotatably disposed in the first fluid chamber via a shaft 54'. Similar to the previous embodiment, the wiper assembly creates a pressure differential within the first fluid chamber when a force in excess of a predetermined value is applied to the vehicle safety belt assembly. A throttle valve 80' is operably disposed in a first fluid passage 220 connecting the first and second fluid chambers. The throttle valve controls fluid pressure in the first fluid chamber 204 by selectively allowing fluid flow between the first fluid chamber and second fluid chamber 206.

In operation, when a force applied to the retractor (FIG. 1) exceeds a predetermined value, the retractor, via the clutch 70' (illustrated schematically) engages the wiper assembly 50'. The wiper 52' rotates in first fluid chamber 204 creating a volume of high pressure within the first fluid chamber which resists and absorbs a portion of the applied force to the vehicle occupant. The hydraulic fluid 26', which is displaced by the wiper assembly, is forced through the throttle valve located in the first passage 220 into the second fluid chamber 206. Again, the throttle valve acts as a resistor which restricts the transfer of fluid therethrough. This resistor effect provides a high resistance to the rotational movement of the wiper assembly, and thus also resists rotational movement of the retractor and winding out of the safety belt 14'. Because the second fluid chamber is also filled with hydraulic fluid, the flow of the fluid into the second fluid chamber causes the fluid contained therein to flow through a second fluid passage 222 defined by the body 202 back into the first fluid chamber 204. The work performed in displacing the fluid from the first fluid chamber 204 to the second fluid chamber 206 dissipates superfluous energy and dampens the impact effect on the occupant restrained by the seat belt. A return spring 230 can be interposed between the radial wall 214 and the wiper 52' in a manner which induces the wiper to return to its original position after a force limiting operation has occurred. It should be appreciated that alternative means for returning the wiper are also contemplated (e.g., a solenoid).

Viscous liquids are used as the hydraulic fluid 26'. The viscosity and density of the hydraulic fluid are selected with respect to the dimension of the fluid passages 220 and 222. It is possible to use an electro-viscous liquid whose viscosity can be adjusted by means of an electric signal (i.e. an electro and/or magneto-rheological fluid which increases in viscosity in response to an electromagnetic field). For example, electrodes (not shown) can be disposed proximate the load limiting device 200 so as to enable the formation of an electromagnetic field which will induce an increase in viscosity in an electrorheopectic fluid in the fluid chambers. The resistance to the rotational movement of the wiper assembly 50' and the rotation movement of the retractor may be accordingly controlled by the application of an electric signal.

Figure 6:
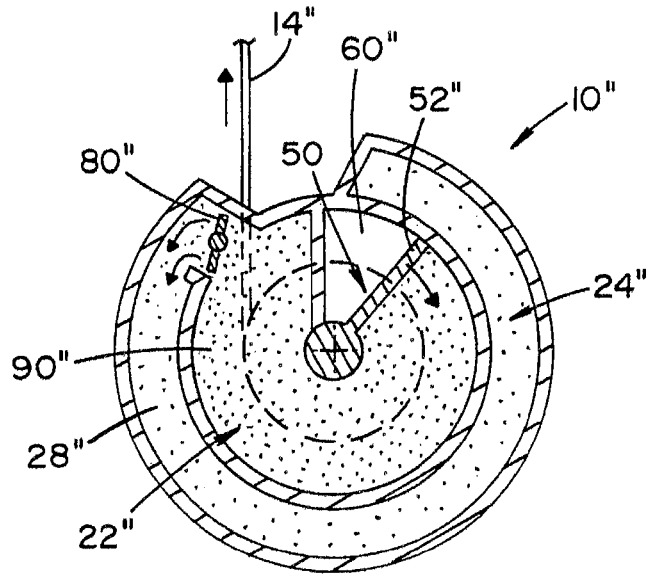
FIG. 6 is a cross-sectional view of another alternate variable load limiting device in a first position.

Another embodiment of a variable load limiting device for the vehicle safety belt assembly (FIG. 1) is shown in FIG. 6. Since most of the structure and function is similar to the variable load limiting device 10 of the first embodiment, reference numerals with a double primed suffix (") refer to like components.

The variable load limiting device 10" illustrated in FIG. 6 is substantially similar to variable load limiting device 10 except for the free-flowing medium contained in the first and second fluid chambers 22" and 24". Each chamber contains an inert gas 28" therein. In operation, during a high velocity crash, when the force exerted by the seat belt 14" on the vehicle occupant is extremely high and can itself cause injury, the wiper 52" begins to rotate within the first fluid chamber 22" thereby increasing the volume of a low pressure zone 60". The inert gas is displaced and compressed by the wiper thereby forming a high pressure zone 90". This high pressure zone, in turn, controls the payout of the seat belt by decreasing the rpm of the retractor (FIG. 1). As a result, the restraint of the seat belt on the vehicle occupant increases which corresponds to the deceleration of the vehicle occupant at a very early phase of a crash.

As indicated previously, in response to a crash-related data from a load control (FIG. 1), the throttle valve 80" can be opened to bleed the compressed gas from the first fluid chamber 22" to the second fluid chamber 24" as the wiper assembly rotates. However, unlike hydraulic fluid, because the inert gas is compressible, the throttle valve does not have to open. Thus, the throttle controls the gas pressure in the first fluid chamber. In the event the throttle valve is opened, the compressed gas from the high pressure zone flows into the second fluid chamber thereby creating a third pressure zone. The pressure in this third zone is initially lower than the pressure of the high pressure zone 90" and greater than the pressure of the low pressure zone 60". The pressures in the third pressure zone and high pressure zone can equalize depending on the displacement of the throttle valve.

As the vehicle occupant decelerates, the disengagement of the clutch (FIG. 1) disengages the wiper assembly 50". The compressed gas and the vacuum created by the low pressure zone 60" act in concert to draw the wiper assembly to back its original position. Thus, the pressure differential in the fluid chambers created by activation of the wiper assembly 50"

returns the load limiting device 10" to a state which is substantially similar to a state prior to activation of the load limiting device whereby the load limiting device may be activated a plurality of times.

As to a further discussion of the manner of usage and operation of the variable load limiting device 10", the same should be apparent from the above description relative to the first embodiment. Accordingly, no further discussion relating to the manner of usage and operation will be provided.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A variable load limiting device for a vehicle safety belt assembly for controllably restraining a vehicle occupant by the vehicle safety belt assembly during deceleration of a vehicle, the device comprising:
   a body including a first fluid chamber in selective communication with a second fluid chamber, each fluid chamber containing a free-flowing fluid therein wherein the body includes a cylindrical outer wall and a cylindrical inner wall, an inner surface of the inner wall at least partially defines the first fluid chamber, an outer surface of the inner wall and the outer wall at least partially defines the second fluid chamber, wherein a fluid passage is defined in the body via an opening in the inner wall, the fluid passage fluidly connecting the first and second fluid chambers;
   a wiper assembly operably disposed in the first fluid chamber and selectively coupled to the vehicle safety belt assembly, the wiper assembly creating a pressure differential within the first fluid chamber when a force in excess of a predetermined value is applied to the vehicle safety belt assembly; and
   a throttle valve operably connected to the body for controlling fluid pressure in the first fluid chamber, wherein the throttle valve is located in the fluid passage between the fluid chambers, the throttle valve controlling fluid pressure in the first fluid chamber by selectively allowing fluid flow between the fluid chamber and the second fluid chamber, the throttle valve opens to bleed fluid from the first fluid chamber to the second fluid chamber as the wiper assembly rotates and a drop in fluid pressure of the first fluid chamber allows fluid that was bled into the second fluid chamber back into the first fluid chamber.

2. The variable load limiting device of claim 1, wherein the body includes a first housing and a second housing, the first housing at least partially defining the first fluid chamber, the second housing at least partially defining the second fluid chamber.

3. The variable load limiting device of claim 2, wherein the first housing includes a first longitudinal axis and the second housing includes a second longitudinal axis, the first axis being generally coincident with the second axis.

4. The variable load limiting device of claim 2, wherein the second housing at least partially surrounds the first housing.

5. The variable load limiting device of claim 1, wherein the wiper assembly includes a wiper moveably located in the first fluid chamber.

6. The variable load limiting device of claim 5, wherein the variable load limiting device further comprises a clutch, an input of the clutch is operably connected to a retractor of the vehicle safety belt assembly and an output of the clutch is operably connected to the wiper.

7. The variable load limiting device of claim 1, further comprising a load control operably connected to the throttle valve, the load control adjusting the throttle valve as a function of vehicle crash-related data.

8. The variable load limiting device of claim 1, wherein the pressure differential in the first fluid chamber created by activation of the wiper assembly returns the load limiting device to a state which is substantially similar to a state prior to activation of the load limiting device whereby the load limiting device may be activated a plurality of times.

9. A vehicle safety belt assembly comprising:
   a retractor for winding up a safety belt;
   a clutch having an input and an output, the input being operably connected with the retractor;
   a body including a first fluid chamber in selective communication with a second fluid chamber, each chamber containing a fluid;
   a throttle valve disposed in a fluid passage connecting the first and second fluid chambers, the throttle valve selectively allowing fluid flow between the first chamber and the second chamber;
   a wiper assembly located in the first fluid chamber and selectively coupled to the vehicle safety belt assembly, the wiper assembly including a wiper operably connected to the output of the clutch and sealingly engaging an inner surface of a wall defining the first fluid chamber, as the wiper rotates within the first fluid chamber fluid in the first fluid chamber is moved toward the throttle valve and bleeds through the throttle valve from the first fluid chamber to the second fluid chamber, wherein the second fluid chamber contains hydraulic fluid and a compressible inert gas, as fluid is bled into the second fluid chamber from the first fluid chamber via the fluid passage, the hydraulic fluid compresses the gas.

10. The assembly of claim 9, wherein the wiper assembly is in an original position prior to activation of the wiper assembly and a pressure differential between the first chamber and the second chamber created by activation of the wiper assembly draws the wiper assembly back to the original position upon disengagement of the clutch with the wiper assembly.

11. The assembly of claim 9, wherein the wiper assembly and a radial wall extending inwardly from the body into the first fluid chamber together define a first fluid chamber low pressure zone, wherein no hydraulic fluid is contained in the first fluid chamber low pressure zone.

12. The assembly of claim 9, further comprising a return spring in the first chamber, wherein the wiper assembly is in an original position prior to activation of the wiper assembly and the return spring induces the wiper to return to the original position.

13. The assembly of claim 9, wherein a drop in fluid pressure of the first fluid chamber allows fluid that was bled into the second fluid chamber back into the first fluid chamber through the fluid passage.

14. A vehicle safety belt assembly comprising:
   a retractor for winding up a safety belt;
   a clutch having an input and an output, the input being operably connected with the retractor;
   a body including a first fluid chamber in selective communication with a second fluid chamber, each chamber containing a fluid;

a throttle valve disposed in a fluid passage connecting the first and second fluid chambers, the throttle valve selectively allowing fluid flow between the first chamber and the second chamber;

a wiper assembly located in the first fluid chamber and selectively coupled to the vehicle safety belt assembly, the wiper assembly including a wiper operably connected to the output of the clutch and sealingly engaging an inner surface of a wall defining the first fluid chamber, as the wiper rotates within the first fluid chamber fluid in the first fluid chamber is moved toward the throttle valve and bleeds through the fluid passage from the first fluid chamber to the second fluid chamber, wherein the wiper assembly and a radial wall extending inwardly from the body into the first fluid chamber together define a first fluid chamber low pressure zone, wherein no hydraulic fluid is contained in the first fluid chamber low pressure zone.

15. The assembly of claim 14, wherein the second fluid chamber contains hydraulic fluid and a compressible gas, as fluid is bled into the second fluid chamber from the first fluid chamber via the fluid passage, the hydraulic fluid compresses the gas.

16. The assembly of claim 14, wherein a drop in fluid pressure of the first fluid chamber allows fluid that was bled into the second fluid chamber back into the first fluid chamber through the fluid passage.

17. The assembly of claim 14, wherein the body includes a cylindrical outer wall and a cylindrical inner wall, an inner surface of the inner wall at least partially defines the first fluid chamber, an outer surface of the inner wall and the outer wall at least partially defines the second fluid chamber, wherein the fluid passage is defined in the body via an opening in the inner wall.

* * * * *